April 9, 1929.  A. M. BARRETT  1,707,971
LIFTING TRUCK
Filed March 8, 1923   3 Sheets-Sheet 1

Patented Apr. 9, 1929.

1,707,971

UNITED STATES PATENT OFFICE.

ARTHUR M. BARRETT, OF WINNETKA, ILLINOIS.

LIFTING TRUCK.

Application filed March 8, 1928. Serial No. 693,623.

My invention relates to lifting trucks of the type comprising a wheel-supported frame arranged to be steered by means of a lever or handle, which also is employed to raise a lifting frame or platform supported by the wheeled or main frame. In trucks of this description it is common to connect the lifting frame with the main frame by links attached to the end portions of said frames, and so arranged that forward pull on the lifting frame causes it to rise and at the same time move forward. Two wheels are usually provided at the rear of the truck for supporting the main frame, and either one or two steering wheels support the forward portion of the main frame and have swiveled connection therewith so that by turning said wheel or wheels through the instrumentality of the handle the truck may be steered. The steering wheel or wheels are generally connected with the main frame by means of a crosshead which extends transversely of the main frame at or near its forward end and is fixedly connected with the side members of the main frame. In using these trucks they are backed under an inverted U-shaped support or platform on which the load to be transported is piled, the lifting platform being then in its lowermost position. Said lifting frame is then elevated by swinging the lever or handle forward, thereby raising the load-supporting platform with its load sufficiently high to safely clear the floor. The lifting frame is at once automatically locked in its elevated position and the truck with its load may be freely moved to the place where it is desired to deposit the load. The latch which holds the lifting frame in its elevated position is then released to permit said frame to descend and deposit the load-supporting platform on the floor, whereupon the truck may be withdrawn. Usually a check is provided to cushion and control the descent of the lifting platform.

In trucks of this description, in lifting a load the greatest expenditure of power is required at the beginning of the lifting operation when the links connecting the lifting frame with the main frame are most nearly in a horizontal position, but when said links approach a vertical position much less lifting effort is necessary. It is therefore desirable that the leverage of the handle effective for lifting the load be greatest during the early stages of the lifting operation, and that the loss of speed incident thereto be compensated for by increased speed with reduced leverage during the later stages. The operator thus may exert the greatest lifting effort under conditions most favorable to its application, since when commencing to lift he can conveniently exert a greater effort as the handle then stands in an approximately vertical position so that he is able to brace himself against one end of the truck and exert a strong forward pull on the handle. He also operates under favorable conditions toward the end of the lifting operation, as then the handle approaches a horizontal position and he can throw his weight on it. Between these two stages, however, as when the handle is about halfway down, there is a point where the operator is out of balance and therefore operates under unfavorable conditions, although this is compensated for to some extent by the more favorable angle at that time of the connecting links. One of the objects of my present invention is to provide an improved construction by which the lifting effort required is less than formerly not only during the early stages of the lifting operation, but also during the intermediate stage when the operator is out of balance because of the necessity of changing his position from one where he pulls on the handle to one where he throws his weight upon it in a downward direction. Again, trucks of this type are often used in narrow aisles and other places where it is inconvenient, if not impossible, to swing the handle in the longitudinal plane of the truck, and therefore it is necessary to turn it at an angle in order to operate it, and to provide a truck by which this may be done without inconvenience or loss of efficiency is another object of my invention. Further objects are to provide improved means for locking the lifting frame in its elevated position, and to provide improved means for controlling the descent of the lifting frame whether loaded or unloaded. I accomplish these objects as illustrated in the drawings and as hereinafter particularly described. What I regard as new is set forth in the claims.

In the accompanying drawings,—

Figure 1:
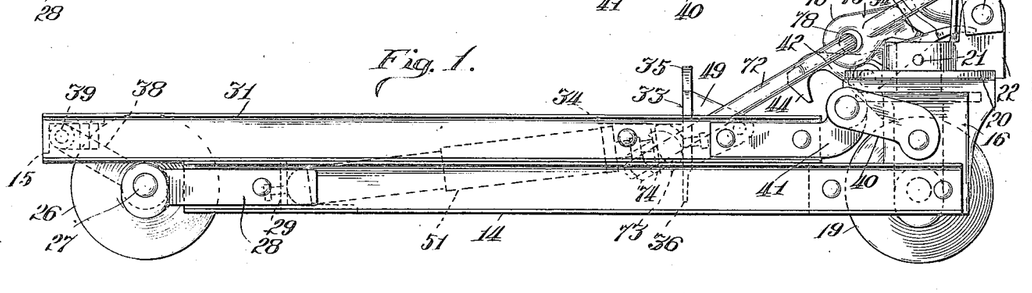
Fig. 1 is a side elevation of my improved truck showing the lifting frame lowered and the handle in its upright position.
Figure 2:
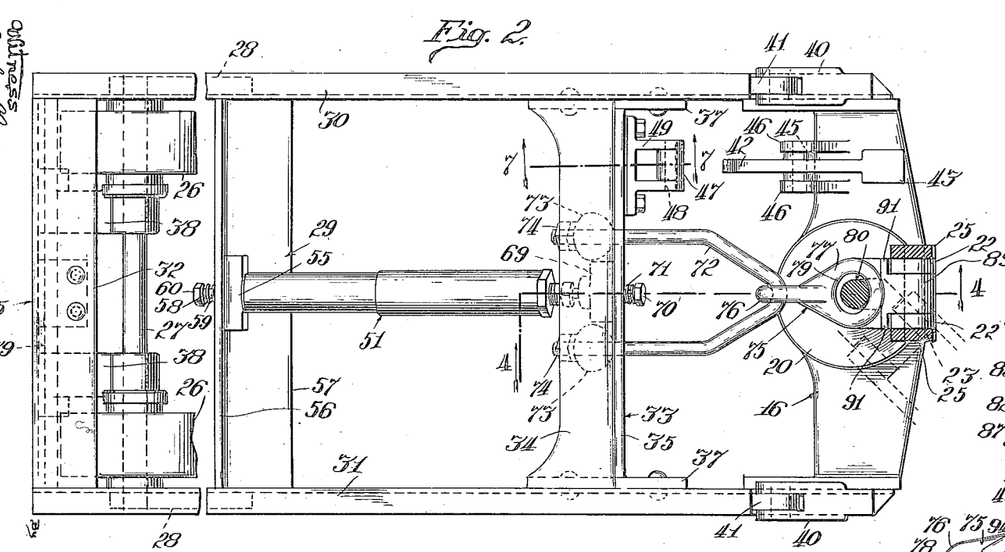
Fig. 2 is a plan view thereof, the handle being in section.
Figures 3, 4, 5, 6:
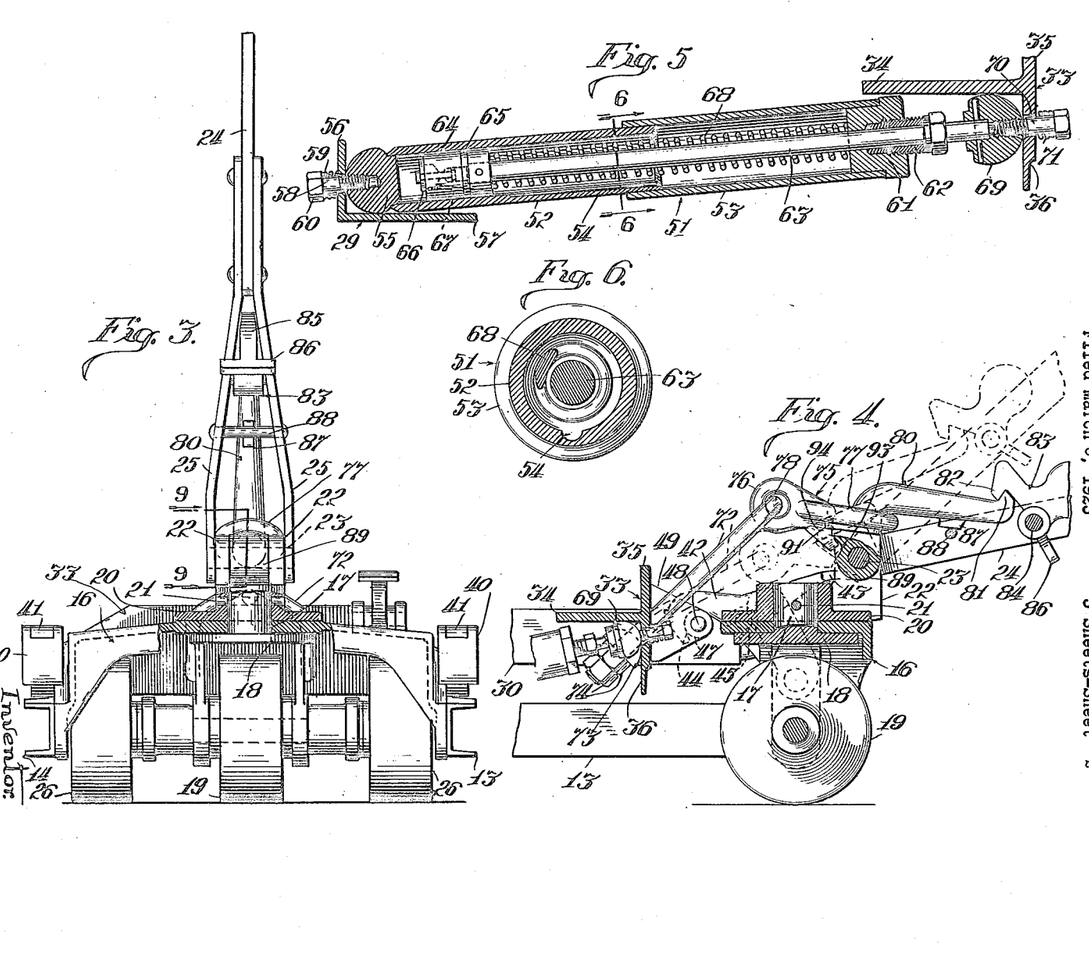
Fig. 3 is a front elevation, part of the crosshead being in section.
Fig. 4 is a detail, being a partial vertical section on line 4—4 of Fig. 2 showing the lifting frame elevated and the handle in the position it then occupies, an intermediate stage being also shown in dotted lines in this figure.
Fig. 5 is a longitudinal vertical section showing the construction and mounting of the check by which the descent of the lifting frame is controlled.
Fig. 6 is an enlarged vertical cross-section on line 6—6 of Fig. 5.
Figure 7:
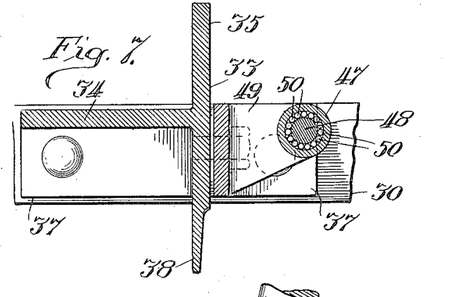
Fig. 7 is a vertical section on line 7—7 of Fig. 2 showing the construction of the roller which cooperates with the latch by which the lifting frame is locked in its elevated position.

Referring to the drawings,—13, 14 indicate the side members of the main or wheeled frame, which are preferably channel bars, as shown in Fig. 3, and are rigidly connected together at their front ends by a crosshead 16. Said crosshead is in the form of an inverted U, as shown in Fig. 3, and is provided with a centrally located bearing for the vertical pivot 17 of a yoke 18 in which is mounted a front steering wheel 19. It will be understood that while I have shown a single steering wheel, my invention is not limited to the use of a single wheel, as for that purpose any desired construction may be employed. In the embodiment of my invention illustrated, the pivot 17 is non-rotatably connected with a bearing plate 20 which rests on the crosshead 16, this connection being preferably by a pin 21 as shown in Figs. 3 and 4. The bearing plate 20 is provided with upwardly projecting ears 22 spaced apart to form a yoke, as shown in Figs. 2 and 3, through which ears extends a pivot pin 23, as best shown in Fig. 4. From an inspection of said figures it will be seen that the ears 22 are offset in relation to the axis of the steering wheel pivot 17 and are disposed in front thereof. 24 indicates the steering handle, which also functions as a lever for raising the lifting frame, hereinafter described, and is preferably in the form of a bar having the usual crosspiece at its upper end, and having diverging side members 25 by which the handle is pivoted upon the pivot 23 so as to swing generally in a fore and aft direction. It will be apparent that the handle is also capable of swinging laterally, or to one side or the other of the longitudinal axis of the truck, to steer the wheel 19. 26 indicates the rear wheels, which are mounted on a rear axle 27 supported by hangers 28 secured to the side members 13, 14 of the main frame, as shown in Fig. 1. 29 indicates a cross-beam which is fixedly connected with the side members 13, 14 of the main frame adjacent to the rear end of the truck, as shown in Fig. 2, and secures the rear portions of said side members firmly together. 30, 31 indicate the side members of the lifting frame which overlie the side members 13, 14 of the main frame and at their rear ends are cross-connected by an angle bar 15 best shown in Fig. 2. Near their front ends the side members 30, 31 are connected by a cross-beam 33, which is preferably in the form of a T-bar of which 34 indicates the horizontal flange and 35, 36 the vertical flanges, as best shown in Fig. 4. The beam 33 is preferably provided at its ends with forwardly extending ears 37 which fit against the inner surfaces of the side bars 30, 31 and are riveted thereto, as shown in Fig. 2, thereby providing a very secure and rigid construction. The lifting frame is connected with the main frame at the rear by swinging links 38 pivoted on the axle 27, and pivotally connected with the lifting frame by means of a cross-rod 39, best shown in dotted lines in Fig. 1. The forward end of the lifting frame is connected with the main frame by swinging links 40 which are pivoted to the end portions of the crosshead 16, as shown in Fig. 1, and to straps 41 which are fixedly connected to the forward ends of the side members 30, 31 and have upturned ends so that the links 40 are normally inclined slightly forward and downward from their point of connection with the straps 41 when the lifting frame is in its lowermost position, and approach but do not quite reach a vertical position when the lifting frame has been raised to the highest extent. By pulling forward on the lifting frame the links 38, 40 will be caused to swing in a clockwise direction as viewed in Fig. 1, thereby raising the lifting frame, but when said frame is in its highest position there will be a slight tendency for it to descend by gravity. To overcome this tendency and hold the lifting frame in its elevated position, I provide a latch 42 shown in Figs. 1 and 2 in the form of a lever having a pedal 43 at its front end and a hook 44 at its rear end. This latch is pivoted between its ends on a pivot 45 mounted between lugs 46 carried by the crosshead 16, as shown in Fig. 2. Cooperating with the hook 44 is a roller 47 carried by a pivot pin 48 mounted in a yoke 49 secured to the cross-beam 33, as shown in said figure. The roller 47 is in the form of a cylinder mounted on anti-friction bearings 50 arranged between it and the pin 48, as shown in Fig. 7, so that said cylinder turns freely. Said roller is so arranged with reference to the latch 42 that when the lifting frame is raised to its uppermost position the hook 44 rides over it and engages it, thereby preventing rearward movement and consequently holding the lifting frame in its elevated position.

The descent of the lifting frame is cushioned and controlled by means of a check 51 interposed between the cross-beams 29 and 33, as shown in Fig. 2. This check is in the form of a cylinder composed of two tubes 52, 53 of different diameters, the forward end of the smaller tube 52 being telescoped into the rear end of the tube 53, with the overlapping portions welded together so that a continuous cylinder is formed, the diameter of the rear portion of which is less than that of the front portion. The tube 52 for a part of its length is provided with a tapered groove 54 in its inner surface and disposed longitudinally thereof, said groove growing larger as it approaches the tube 53 and running out at a short distance from the opposite end of the tube 52. A plug 55 having a rounded head is fitted in the rear end of the tube 52 and bears against the vertical and horizontal flanges 56, 57 of the cross-beam 29, the rounded head forming a rocker bearing for that end of the check. A bolt 58 passes through the flange 56 and into a threaded socket in the plug 55 for connecting said plug with said flange. As shown in Fig. 5, the hole in said flange through which the bolt 58 extends is slightly larger than the bolt so that the bolt is capable of rocking slightly to accommodate any movement of that character imparted to the plug 55. A spring 59 mounted on the bolt 58 between the head 60 thereof and the flange 56 yieldingly holds the rounded head of the plug 55 in engagement with said flange. The tube 53 is provided at its forward end with a plug 61, and through this plug, which is provided with a gland 62, extends a piston rod 63, at the inner end of which is a piston 64 arranged to operate in the tube 52, and preferably provided with a piston ring 65. The forward end of the piston rod 63 is connected with the lifting frame in the manner hereinafter described. Said piston is provided with a check valve 66 seated in the rear end of the piston and serving to substantially close a duct 67 which operates as a by-pass to permit leakage of the fluid in the cylinder past the piston 64 at the beginning of the forward movement of the piston, which occurs when the lifting frame is being raised. The check valve 66, however, serves to close said by-pass when the piston moves in the opposite direction. During the lifting operation, as soon as the piston moves forward far enough to pass the rear end of the groove 54, the liquid in the cylinder can by-pass the piston through said groove, and the same is true during the lowering operation, but by reason of the taper of said groove the by-passing of the piston by the fluid is gradually restricted as the lifting frame descends, thereby increasing the checking effect to compensate for the greater inclination of the links 38, 40. The consequence is that the descent of the load is made uniform. When the rear end of the piston passes beyond the groove 54, further by-passing of the fluid is prevented except for slight leakage around or through the check valve, and consequently the descent of the lifting frame is arrested without shock. To aid in starting the descending movement of the lifting frame, a spring 68 is mounted on the piston rod 63 between the piston and the plug 61, as shown in Fig. 5. The forward end of the piston rod 63 is connected with the lifting frame rod 63 in much the same way as the rear end of the cylinder is connected with the main frame. As shown in Fig. 5, at its forward end the piston rod 63 is provided with a rounded head 69 which bears against the horizontal flange 34 and vertical flange 36 of the cross-beam 33, and is connected with the latter by a bolt 70 which screws into the head 69 and carries a spring 71, thus providing a yielding rocking bearing for the forward end of said piston rod. By this construction the check as a whole is yieldingly connected with the main and lifting frames, and the parts thereof are permitted to rock to adjust themselves to the movement of the lifting frame.

Figure 8:
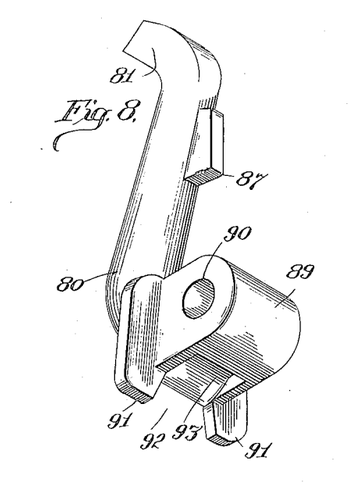
Fig. 8 is a perspective view of a shackle member through which the handle is operatively connected with the lifting frame.
Figure 9:
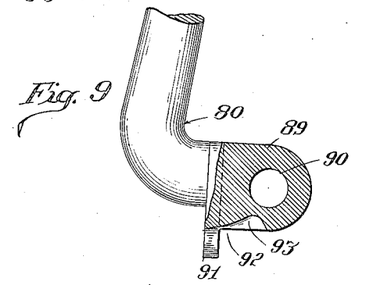
Fig. 9 is a detail view of the same part, being a partial section thereof on line 9—9 of Fig. 3.
Figure 10:
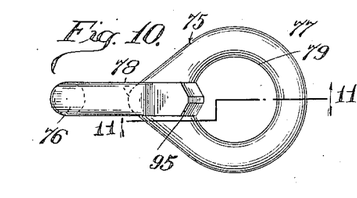
Fig. 10 is an underside view of a double link through which the shackle member shown in Fig. 8 is connected with the lifting frame.
Figure 11:
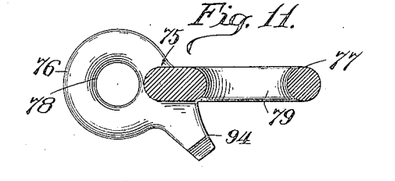
Fig. 11 is a section on line 11—11 of Fig. 10.
Figure 12:
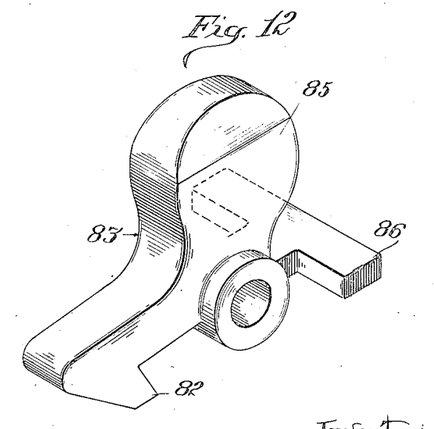
Fig. 12 is a perspective view of the latch by which the shackle member is held in operative relation to the handle.

Coming now to the connections between the lever or handle 24 and the lifting frame, 72 indicates a yoke, the forward portion of which is substantially V-shaped, as shown in Fig. 2. The separated rear ends of the yoke pass through the vertical flange 36 of the cross-beam 33, as shown in Figs. 1 and 4, and carry rounded heads 73, as shown in dotted lines in Fig. 2. These heads are secured in place by nuts 74 screwed on the rear ends of the yoke, as shown in Fig. 4. The heads 73 bear in the angle between the members 34, 36 of the cross-beam 33, so that they form rocker bearings for the yoke and permit its forward end to swing slightly, thereby preventing binding during the operation of raising or lowering the lifting frame. The yoke 72 carries a double link 75 comprising members 76, 77 rigidly connected together and disposed at a right angle to each other, the member 76 having a horizontally disposed eye 78 and the member 77 a vertically disposed eye 79. The member 76 is linked to the yoke 72, engaging the V-shaped forward portion thereof, and the member 77 is linked to a shackle member 80 which passes through the eye 79 thereof, as shown in Figs. 1 and 2. The shackle member 80 is in the form of a bellcrank, one end of which is mounted on the pivot 23, and its other or upper end, which is preferably tapered as shown in Figs. 1 and 8, is provided with a lug or tooth 81 adapted to be engaged by the hook portion 82 of a latch 83 mounted on the handle 22 by means of a pivot 84. As shown in Figs. 1 and 2, the lower end of the shackle member 80 extends between the side members 25 of the handle 24, and the latch 83 is also mounted between said side members. Said latch is provided with a counterbalance 85 and with a thumb piece 86, as shown in Fig. 1, the thumb piece 86 being to permit manual disengagement of the latch with the shackle member 80, and the counterbalance 85 being provided for the purpose of automatically operating said latch to cause it to engage or disengage the shackle member 80, as the case may be. For example, when the handle 24 is turned quickly to the upright position shown in Fig. 1, the counterbalance will move the latch into position to engage the shackle member 80, and when the handle is turned down the counterbalance will tend to move to the dotted line position shown in Fig. 1, so that by slightly lifting the handle after the lifting frame has been locked in its uppermost postion the latch will automatically disengage the shackle 80, leaving the handle free to be swung laterally to any extent necessary in steering or manipulating the truck. Preferably the shackle member 80 is provided at its forward side with a lug 87 adapted to engage a pin 88 carried by the handle, thus providing a limit stop to prevent excessive forward movement of said shackle member, and also to prevent excessive rearward movement of the handle thereby enabling the handle to be conveniently used in backing the truck. As best shown in Figs. 8 and 9, the shackle member 80 is provided at its lower end with a boss 89 having a bearing 90 for the pin 23, and also with a plate 91 which is approximately parallel with the handle 24 when the shackle member in connected therewith, and when the shackle member is in its upright position engages the bearing plate 22 and forms a stop to limit further rearward movement of the shackle member. This plate extends at both sides of the shackle member, and at its under margin is provided with a V-shaped notch 92 which registers with a recess 93 in the under surface of the boss 89. The notch 92 and recess 93 are adapted to receive a dog 94 which projects downwardly from the member 76 of the double link 75, as best shown in Figs. 10 and 11. As shown at 95 in the latter figure, the end of the dog 94 is beveled for the purpose of guiding it into the notch 92, should the steering handle be turned laterally from its fore and aft position at the time the lifting operation is commenced. The function of these parts will be understood from the following explanation of the lifting operation:

At the beginning of the lifting operation, the parts occupy the position shown in Fig. 1, at which time, as will be seen, the connection between the lifting frame and the handle 24 is at a point close to the pivot or fulcrum 23 of the handle; consequently the leverage of the handle is greatest at that time. The plate 91 then stands at a considerable angle to the member 77 of the link 75, but when the handle is moved forward and downward the plate 91 is swung around until it bears against the under surface of the member 77, so that then the link 75 forms an extension of the handle reducing its leverage but increasing the speed of the lifting operation. Incidentally the handle lever is converted from a lever of the second class to a lever of the first class with a load arm, then provided by the link 75, of different length. When this occurs the dog 94 moves into the notch 92 and recess 93, thereby limiting the extent to which the link 75 may swing laterally relatively to the handle, while at the same time holding them in operative relation to each other. It will be seen that, owing to the link connection between the handle and lifting frame, the handle may be swung laterally to a considerable extent at any time during the lifting operation without interfering with its effectiveness, and this will not interfere with the engagement of the dog 94 with the notch 92, because the sides of said notch flare sufficiently to enable said dog to enter it, to which end the beveling of the end of the dog contributes. The capability of the link 75 of swinging laterally to a limited extent independently of the handle 24 avoids the tendency, present in some prior constructions, of the load to move the handle farther from a straight fore and after position if it should be out of such position during the lifting operation, and consequently it makes easier the operation of lifting with the handle at an angle to the longitudinal axis of the truck. From the foregoing description it will be seen that by my improved construction the lifting effort required is distributed to the best advantage during the lifting operation, since the greatest leverage is provided when the load resistance is greatest, and the leverage is less when the load approaches its highest position, at which time it moves more easily.

It will be noted that when the lifting lever or handle 24 is in its upright position the member 77 of the link 75 is substantially alined vertically with the steering axis of the truck, as shown in Fig. 1, and that when the lifting frame is in its elevated position and the handle is lowered to its steering position the member 76 of said link is then substantially alined vertically with said steering axis, as shown in Fig. 4. As the member 77 has a laterally flexible connection with the steering handle through the shackle member 80, and the member 76 has a laterally flexible connection with the lifting frame through the yoke 72, the variable lever action above described does not interfere with the lateral swinging of the handle 24 during the lifting operation.

Having thus described the embodiment of my invention illustrated in the drawings, I wish it to be understood that my invention is not limited to the specific construction shown and described, except in so far as such construction is specifically claimed, but includes such variations or modifications of the generic subject matter pointed out in broader claims as would occur to those skilled in the art.

What I claim as my invention and desire to secure by Letters Patent, is—

1. In a lifting truck, the combination of a main frame, supporting and steering wheels therefor, a lifting frame mounted on said main frame, a lifting lever, and a connection between said lever and the lifting frame comprising means pivotally connected with said lever to swing laterally and vertically when the lever is upright, and cooperating with said lever to form an extension of the load arm thereof during the latter part of the lifting operation.

2. In a lifting truck, the combination of a main frame, supporting and steering wheels therefor, a lifting frame mounted on said main frame, a lifting lever, and a connection between said lever and the lifting frame comprising a link, connected with the lifting lever to swing laterally and vertically during the first part of the lifting operation and adapted to form an extension of the load arm of said lever during the latter part of the lifting operation.

3. In a lifting truck, the combination of a main frame, supporting and steering wheels therefor, a lifting frame mounted on said main frame, a lifting lever, and a connection between said lever and the lifting frame comprising laterally swinging means operating automatically during the latter part of the load lifting movement of said lever to shift the load arm of said lever from one side to the other of the fulcrum thereof.

4. In a lifting truck, the combination of a main frame, supporting and steering wheels therefor, a lifting frame mounted on said main frame, a lifting lever, and a connection between said lever and the lifting frame comprising a shackle member pivotally connected at its lower end with the lower portion of said lever, means detachably connecting the upper end of said shackle member with the lever, a link connected with said shackle member and with the lifting frame and means cooperating with said link to form an extension of said lever during the latter part of the lifting operation.

5. In a lifting truck, the combination of a main frame, supporting and steering wheels therefor, a lifting frame mounted on said main frame, a lifting lever, and a connection between said lever and the lifting frame comprising a shackle member pivotally connected at its lower end with the lower portion of said lever, means detachably connecting the upper end of said shackle member with the lever, a rigid link connected with said shackle member and with the lifting frame, and a plate carried by said shackle member and adapted to engage and support said link during the latter part of the lifting operation.

6. In a lifting truck, the combination of a main frame, supporting and steering wheels therefor, a lifting frame mounted on said main frame, a lifting lever, and a connection between said lever and the lifting frame comprising a shackle member pivotally connected at its lower end with the lower portion of said lever, means detachably connecting the upper end of said shackle member with the lever, a rigid link connected with said shackle member and with the lifting frame, a plate carried by said shackle member and adapted to engage and support said link during the latter part of the lifting operation, and means for limiting the lateral movement of said link during the latter part of the lifting operation.

7. In a lifting truck, the combination of a main frame, supporting and steering wheels therefor, a lifting frame mounted on said main frame, a lifting lever, and a connection between said lever and the lifting frame comprising a shackle member pivotally connected at its lower end with the lower portion of said lever, means detachably connecting the upper end of said shackle member with the lever, a rigid link connected with said shackle member and with the lifting frame, a plate carried by said shackle member and adapted to engage and support said link during the latter part of the lifting operation, a dog carried by said link, and a notch in said plate adapted to receive said dog during the latter part of the lifting operation.

8. In a lifting truck, the combination of a main frame, supporting and steering wheels therefor, a lifting frame mounted on said main frame, a lifting lever, and a connection between said lever and the lifting frame comprising a shackle member pivotally connected at its lower end with the lower portion of said lever, means detachably connecting the upper end of said shackle member with the lever, a rigid link connected with said shackle member, a plate carried by said shackle member and adapted to engage and support said link during the latter part of the lifting operation, and a yoke connected with the lifting frame, said link being pivotally connected with said yoke to swing laterally and vertically relatively thereto.

9. In a lifting truck, the combination of a main frame, supporting and steering wheels therefor, a lifting frame mounted on said main frame, a lifting lever, and a connection between said lever and the lifting frame comprising a shackle member pivotally connected at its lower end with the lower portion of said lever, means detachably connecting the upper end of said shackle member with the lever, a rigid link connected with said shackle member, a plate carried by said shackle member and adapted to engage and support said link during the latter part of the lifting operation, means for limiting the lateral movement of said link during the latter part of the lifting operation, and a yoke connected with the lifting frame, said link being pivotally connected with said yoke to swing laterally and vertically relatively thereto.

10. In a lifting truck, the combination of a main frame, supporting and steering wheels therefor, a lifting frame mounted on said main frame, a lifting lever, and a connection between said lever and the lifting frame comprising a shackle member pivotally connected at its lower end with the lower portion of said lever, means detachably connecting the upper end of said shackle member with the lever, a rigid link connected with said shackle member, a plate carried by said shackle member and adapted to engage and support said link during the latter part of the lifting operation, a dog carried by said link, a notch in said plate adapted to receive said dog during the latter part of the lifting operation, and a yoke connected with the lifting frame, said link being pivotally connected with said yoke to swing laterally and vertically relatively thereto.

11. In a lifting truck, the combination of a main frame having supporting and steering wheels, a lifting frame mounted on said main frame, a steering and lifting lever, a connection between said lever and the lifting frame comprising a rigid double link having eyes in the end portions thereof disposed at right angles to each other, one end portion of said link being connected with the handle, and the other end portion thereof with the lifting frame, and means carried by said lever and adapted to cooperate with said link to form an extension of said lever.

12. In a lifting truck, the combination of a main frame having supporting and steering wheels, a lifting frame mounted on said main frame, a steering and lifting lever, a connection between said lever and the lifting frame comprising a rigid double link having eyes in the end portions thereof disposed at right angles to each other, one end portion of said link being connected with the handle, a yoke connected with the lifting frame and with the other end portion of said link, and means carried by said lever and adapted to cooperate with said link to form an extension of said lever.

13. In a lifting truck, the combination of a main frame having supporting and steering wheels, a lifting frame mounted on said main frame, a steering handle, and a connection between said handle and the lifting frame comprising a shackle member pivoted at its lower end upon the fulcrum of said handle, means detachably connecting the upper end of said shackle member with the handle, a double link having an eye at its forward end portion for the reception of said shackle member, and an eye at its rear end portion disposed at right angles to said first-mentioned eye, and a yoke connecting the rear portion of the link with the lifting frame.

14. In a lifting truck, the combination of a main frame, supporting and steering wheels therefor, a lifting frame mounted on said main frame, a lifting lever, and a connection between said lever and the lifting frame comprising a shackle member arranged to be connected with said lever to swing vertically therewith or to be disconnected therefrom to permit independent vertical swinging of said lever, a plate carried by said shackle member and operating to limit rearward movement of said shackle member, and means connected with said shackle member and operable by movement thereof in one direction to lift the lifting frame.

15. In a lifting truck, the combination of a main frame, supporting and steering wheels therefor, a lifting frame mounted on the main frame, a lifting lever, and a connection between said lever and the lifting frame comprising a shackle member pivotally mounted at its lower end adjacent to the lifting lever, the upper end of said shackle member being adapted to be connected with said lever to swing therewith, means for limiting the rearward movement of said shackle member, means operable by upward and rearward movement of said lever to connect it with said shackle member, and means connected with said shackle member and operable by the swinging thereof in one direction to lift the lifting frame.

16. In a lifting truck, the combination of a main frame, supporting and steering wheels therefor, a lifting frame mounted on said main frame, a lifting lever, and a connection between said lever and the lifting frame comprising a connecting member arranged to be connected with said lever to swing vertically therewith, or to be disconnected therefrom to permit independent vertical swinging of said lever, and a link pivotally connected with said connecting member for transmitting power to the lifting frame, said link being arranged to cooperate with said lifting lever to form an extension of the load arm thereof during the latter part of the lifting operation.

17. In a lifting truck, the combination of a main frame, supporting and steering wheels therefor, a lifting frame mounted on said main frame, a lifting lever, and a connection between said lever and the lifting frame comprising a connecting member arranged to be connected with said lever to swing vertically therewith, or to be disconnected therefrom to permit independent vertical swinging of said lever, a link connected with the lifting frame and pivotally connected with said connecting member for lateral swinging at the early part of the lifting operation, said link being arranged to form an extension of the load arm of said lever during the latter part of the lifting operation, and means operating to limit the lateral swinging of said link independently of said lever during the latter part of the lifting operation.

18. In a lifting truck, the combination of a main frame, supporting and steering wheels therefor, a lifting frame mounted on said main frame, a lifting lever, a connection between said lever and the lifting frame comprising means connected with the lifting lever to swing laterally relatively thereto during the first part of the lifting operation and adapted to form an extension of the load arm of said lever during the latter part of the lifting operation, and means for limiting the lateral movement of said connection with respect to the lever during the latter part of the lifting operation.

19. In a lifting truck, the combination of a main frame, supporting and steering wheels therefor, a lifting frame mounted on said main frame, a lifting lever, a connection between said lever and the lifting frame comprising a rigid link connected with the lifting lever to swing laterally relatively thereto during the first part of the lifting operation and adapted to form an extension of the load arm of said lever during the latter part of the lifting operation, and means for limiting the lateral movement of said link with respect to said lever during the latter part of the lifting operation.

20. In a lifting truck, the combination of a main frame, supporting and steering wheels therefor, a lifting frame mounted on said main frame, a lifting lever, a connection between said lever and the lifting frame comprising means having a laterally flexible connection with the lifting lever which is substantially alined vertically with the steering axis of the truck when said lever is in its raised position, and having a laterally flexible connection with the lifting frame which is stubstantially alined vertically with the steering axis of the truck when said lifting frame is in its elevated position, and means for limiting the lateral swinging of said connection relatively to said lever during the latter part of the lifting operation.

21. In a lifting truck, the combination of a main frame, supporting and steering wheels therefor, a lifting frame mounted on said main frame, a lifting lever, a connection between said lever and the lifting frame comprising a rigid link having a laterally flexible connection with the lifting lever which is substantially alined vertically with the steering axis of the truck when said lever is in its raised position, and having a laterally flexible connection with the lifting frame which is substantially alined vertically with the steering axis of the truck when said lifting frame is in its elevated position, and means for limiting the lateral movement of said link with respect to said lever during the latter part of the lifting operation.

22. In a lifting truck, the combination of a main frame, supporting and steering wheels therefor, a lifting frame mounted on said main frame, a lifting lever, a connection between said lever and the lifting frame comprising means having a laterally flexible connection with the lifting lever which is substantially alined vertically with the steering axis of the truck when said lever is in its raised position, and having a laterally flexible connection with the lifting frame which is substantially alined vertically with the steering axis of the truck when said lifting frame is in its elevated position, said connection being adapted to form an extension of the load arm of said lever during the latter part of the lifting operation, and means for limiting the lateral swinging of said connection relatively to said lever during the latter part of the lifting operation.

23. In a lifting truck, the combination of a main frame, supporting and steering wheels therefor, a lifting frame mounted on said main frame, a lifting lever, and a connection between said lever and the lifting frame comprising a rigid link having a laterally flexible connection with the lifting lever which is substantially alined vertically with the steering axis of the truck when said lever is in its raised position, and having a laterally flexible connection with the lifting frame which is substantially alined vertically with the steering axis of the truck when said lifting frame is in its elevated position, said link being adapted to form an extension of the load arm of said lever during the latter part of the lifting operation.

24. In a lifting truck, the combination of a main frame, supporting and steering wheels therefor, a lifting frame mounted on said main frame, a lifting lever, a connection between said lever and the lifting frame comprising a rigid link having a laterally flexible connection with the lifting lever which is substantially alined vertically with the steering axis of the truck when said lever is in its raised position, and having a laterally flexible connection with the lifting frame which is substantially alined vertically with the steering axis of the truck when said lifting frame is in its elevated position, said link being adapted to form an extension of the load arm of said lever during the latter part of the lifting operation, and means for limiting the lateral movement of said link with respect to said lever during the latter part of the lifting operation.

25. In a lifting truck, the combination of a main frame having supporting and steering wheels, a lifting frame mounted on said main frame, a steering and lifting lever, and a connection between said lever and the lifting frame comprising a rigid link having eyes in the end portions thereof, one of said eyes being connected with said lifting lever and being substantially alined vertically with the steering axis of the truck when said lever is in its raised position, the other of said eyes being connected with the lifting frame and being substantially alined vertically with the steering axis of the truck when said lifting frame is in its elevated position, said link being adapted to form an extension of the load arm of said lever during the latter part of the lifting operation.

ARTHUR M. BARRETT.